United States Patent
Jeon et al.

(10) Patent No.: US 11,917,255 B2
(45) Date of Patent: *Feb. 27, 2024

(54) METHODS, SYSTEMS, AND MEDIA FOR PRESENTING MEDIA CONTENT IN RESPONSE TO A CHANNEL CHANGE REQUEST

(71) Applicant: Google LLC, Mountain View, CA (US)

(72) Inventors: Joon-Hee Jeon, Palo Alto, CA (US); Sun-Gi Hong, Yongin-si (KR); Jungshik Jang, Sungnam-si (KR); Jaekyun Seok, Seongnam-si (KR); Jae Seo, Seoul (KR)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/942,736

(22) Filed: Sep. 12, 2022

(65) Prior Publication Data

US 2023/0007356 A1     Jan. 5, 2023

Related U.S. Application Data

(63) Continuation of application No. 16/841,101, filed on Apr. 6, 2020, now Pat. No. 11,445,262, which is a
(Continued)

(51) Int. Cl.
*H04N 21/482* (2011.01)
*H04N 21/81* (2011.01)
*H04N 21/438* (2011.01)

(52) U.S. Cl.
CPC ......... *H04N 21/482* (2013.01); *H04N 21/438* (2013.01); *H04N 21/8153* (2013.01)

(58) Field of Classification Search
None
See application file for complete search history.

(56) References Cited

U.S. PATENT DOCUMENTS 6,804,824 B1    10/2004   Potrebic et al.
2004/0181813 A1   9/2004   Ota et al.
(Continued)

OTHER PUBLICATIONS

Lawler, R., "Cablevision Lets Viewers Watch 9 Channels at Once with New iO TV Quick Views", In Engadget, Mar. 24, 2011, pp. 1-3.
(Continued)

*Primary Examiner* — William J Kim
(74) *Attorney, Agent, or Firm* — Brake Hughes Bellermann LLP (57) ABSTRACT

Methods, systems, and media for presenting media content in response to a channel change request are provided. In some implementations, methods for presenting media content in response to a channel change request are provided, the methods comprising: causing media content provided on a first channel to be presented in a first display area on a first screen; receiving, at a hardware processor, a request to switch to a second channel; in response to receiving the request to switch to the second channel, causing thumbnail content corresponding to the second channel to be presented in the first display area; determining whether media content provided on the second channel is ready for presentation; and in response to determining that the media content provided on the second channel is ready for presentation, causing the media content provided on the second channel to be presented in the first display area.

21 Claims, 7 Drawing Sheets

Related U.S. Application Data continuation of application No. 16/126,484, filed on Sep. 10, 2018, now Pat. No. 10,616,656, which is a continuation of application No. 14/144,380, filed on Dec. 30, 2013, now Pat. No. 10,075,771.

(56) References Cited

U.S. PATENT DOCUMENTS

| | | |
|---|---|---|
| 2004/0268400 A1 | 12/2004 | Barde et al. |
| 2005/0276282 A1 | 12/2005 | Wells et al. |
| 2006/0075428 A1 | 4/2006 | Farmer et al. |
| 2006/0085828 A1 | 4/2006 | Dureau et al. |
| 2006/0200576 A1 | 9/2006 | Pickens et al. |
| 2007/0011702 A1 | 1/2007 | Vaysman |
| 2007/0234395 A1 | 10/2007 | Dureau et al. |
| 2008/0271078 A1 | 10/2008 | Gossweiler et al. |
| 2010/0037267 A1 | 2/2010 | Bennett |
| 2010/0183285 A1 | 7/2010 | Heath et al. |
| 2011/0078743 A1 | 3/2011 | Kim et al. |
| 2011/0088061 A1 | 4/2011 | Rowe |
| 2011/0154406 A1 | 6/2011 | Koo et al. |

OTHER PUBLICATIONS

Notice of Allowance dated May 2, 2022 in U.S. Appl. No. 16/841,101.
Notice of Allowance dated May 10, 2018 in U.S. Appl. No. 14/144,380.
Notice of Allowance dated Nov. 25, 2019 in U.S. Appl. No. 16/126,484.
Office Action dated Jan. 5, 2018 in U.S. Appl. No. 14/144,380.
Office Action dated Mar. 9, 2017 in U.S. Appl. No. 14/144,380.
Office Action dated Mar. 25, 2015 in U.S. Appl. No. 14/144,380.
Office Action dated Jun. 17, 2016 in U.S. Appl. No. 14/144,380.
Office Action dated Jul. 27, 2017 in U.S. Appl. No. 14/144,380.
Office Action dated Aug. 16, 2021 in U.S. Appl. No. 16/841,101.
Office Action dated Aug. 27, 2019 in U.S. Appl. No. 16/126,484.
Office Action dated Oct. 24, 2016 in U.S. Appl. No. 14/144,380.
Office Action dated Nov. 25, 2015 in U.S. Appl. No. 14/144,380.
Office Action dated Dec. 2, 2021 in U.S. Appl. No. 16/841, 101.
Spangler, T., "AT&T Lets U-verse TV Users Customize Mosaic Views", In Multichannel News, Jun. 30, 2010, p. 1.

METHODS, SYSTEMS, AND MEDIA FOR PRESENTING MEDIA CONTENT IN RESPONSE TO A CHANNEL CHANGE REQUEST

CROSS-REFERENCE TO RELATED APPLICATIONS

This application is a continuation of U.S. patent application Ser. No. 16/841,101, filed Apr. 6, 2020, which is a continuation of U.S. patent application Ser. No. 16/126,484, filed Sep. 10, 2018, which is a continuation of U.S. patent application Ser. No. 14/144,380 filed Dec. 30, 2013, each of which is hereby incorporated by reference herein in its entirety.

TECHNICAL FIELD

Methods, systems, and media for presenting media content in response to a channel change request are provided.

BACKGROUND

A digital entertainment system (e.g., a set-top box, a television, etc.) can provide a user with media content, such as live television programs, on-demand programs, etc. using channels that provide different media content. Upon receiving a user request to switch from a current channel to a new channel, a conventional digital entertainment system may not render media content corresponding to the new channel in a timely manner. For example, it may take a second or more for a conventional digital entertainment system to prepare the media content for display by tuning to the new channel, obtaining video signals and/or audio signals being broadcast on the new channel, decoding and/or decompressing the video signals and/or the audio signals, synchronizing the video signals and the audio signals, preparing a video buffer of a display device, etc. As a result, a user may have to wait one or more seconds after pressing a channel change button for the desired content to appear.

Therefore, new mechanisms for presenting media content in response to a channel change request are desirable.

SUMMARY

Methods, systems, and media for presenting media content in response to a channel change request are provided. In some implementations, methods for presenting media content in response to a channel change request are provided, the methods comprising: causing media content provided on a first channel to be presented in a first display area on a first screen; receiving, at a hardware processor, a request for switching to a second channel; in response to receiving the request for switching to the second channel, causing thumbnail content corresponding to the second channel to be presented in the first display area; determining whether media content provided on the second channel is ready for presentation; and in response to determining that the media content provided on the second channel is ready for presentation, causing the media content provided on the second channel to be presented in the first display area.

In some implementations, systems for presenting media content in response to a channel change request are provided, the systems comprising: at least one hardware processor that is configured to: cause media content provided on a first channel to be presented in a first display area on a first screen; receive a request to switch to a second channel; cause thumbnail content corresponding to the second channel to be presented in the first display area in response to receiving the request to switch to the second channel; determine whether media content provided on the second channel is ready for presentation; and cause the media content provided on the second channel to be presented in the first display area in response to determining that the media content provided on the second channel is ready for presentation.

In some implementations, non-transitory media containing computer-executable instructions that, when executed by a processor, cause the processor to perform a method for presenting media content in response to a channel change request are provided, the method comprising: causing media content provided on a first channel to be presented in a first display area on a first screen; receiving a request for switching to a second channel; in response to receiving the request for switching to the second channel, causing thumbnail content corresponding to the second channel to be presented in the first display area; determining whether media content provided on the second channel is ready for presentation; and in response to determining that the media content provided on the second channel is ready for presentation, causing the media content provided on the second channel to be presented in the first display area.

In some implementations, systems for presenting media content in response to a channel change request are provided, the systems comprising: means for causing media content provided on a first channel to be presented in a first display area on a first screen; means for receiving a request for switching to a second channel; means for causing thumbnail content corresponding to the second channel to be presented in the first display area in response to receiving the request for switching to the second channel; means for determining whether media content provided on the second channel is ready for presentation; and means for causing the media content provided on the second channel to be presented in the first display area in response to determining that the media content provided on the second channel is ready for presentation.

In some implementations, the thumbnail content includes at least one thumbnail image.

In some implementations, the thumbnail content includes a video.

In some implementations, the thumbnail content includes an animation.

In some implementations, the systems further comprise: means for identifying a plurality of channels; and means for causing a plurality of thumbnail content items corresponding to the plurality of channels to be presented in a second display area.

In some implementation's, the plurality of thumbnail content items include a plurality of videos.

In some implementations, the systems further comprise: means for receiving a user selection of a thumbnail content item from the plurality of thumbnail content items; means for identifying a channel corresponding to the selected thumbnail content item; and means for causing media content provided on the identified channel to be presented in the first display area.

In some implementations, the second display area is on the first screen.

In some implementations, the second display area is on a second screen.

In some implementations, the systems further comprise means for identifying a third channel; means for storing information about the third channel; and means for causing media content corresponding to the candidate channel to be presented based on the stored information about the third channel in response to receiving a request to switch to the third channel.

In some implementations, the information about the third channel includes a frame.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various implementations, as described in more detail below, mechanisms, which can include systems, methods, and computer-readable media, for presenting media content in response to a channel change request are provided.

In some implementations, the mechanisms can present thumbnail content representing media content available to be selected for presentation on multiple channels using a channel navigation interface. In some implementations, the thumbnail content can include a thumbnail image, a video comprising a set of frames having a reduced spatial and/or temporal resolution, an animation, and/or any other suitable content. In some implementations, the channel navigation interface can be presented on multiple screens concurrently.

In some implementations, the mechanisms can simultaneously present the thumbnail content and a full-screen display/or nearly full-screen display of media content provided on a current channel.

In some implementations, in response to a user selection of a channel from the channel navigation interface (e.g., by selecting a thumbnail image presented in the channel navigation interface), the mechanisms can present a full-screen display or nearly full-screen display of thumbnail content and corresponding audio representing media content provided on the selected channel while media content from the selected channel is prepared for presentation. The thumbnail content representing the media content provided on the selected channel can be presented in a full-screen display or nearly full-screen display of as a set of moving images, an animation, or in any other suitable form, in some implementations.

In some implementations, the mechanisms can identify one or more candidate channels that are likely to be selected and store suitable thumbnail content for the candidate channel(s) so that the thumbnail content can be available for presentation in response to a channel change request.

In some implementations, the mechanisms can arrange and/or present available channels by category (e.g., movies, sports, high-definition content, related media content, and/or any other suitable category of channels). For example, the mechanisms can present thumbnail content representing media content provided on a set of channels associated with a particular category (e.g., a category that is selected by a user) on one or more screens. In a more particular example, when presenting media content provided on a current channel (e.g., a television show about kittens), the mechanisms can present thumbnail content of related media content provided on a set of channels (e.g., kitten videos provided on a video sharing Web site, a Web page with information about kittens, video-on-demand programs related to kittens, a Web page of a store that sells kitten supplies, information on kitten related offers, and/or any other suitable related content).

The mechanisms can be implemented with respect to any suitable channels, such as an analog television channel, a digital television channel, a Web-based television channel, a video-on-demand channel, a Web content channel, a channel provided by a video hosting Web site, a radio channel, an audio channel, a program that can be used to present suitable media content (such as a Web browser, a media player, a streaming program, a gaming program, a book reader, a word processor, a presentation program, and/or any other suitable program), and/or any other suitable channel that contains a visual component and/or an audio component.

In some implementations, any suitable media content can be provided on a channel. For example, media content can include any suitable type(s) of content, such as one or more of audio content, video content, text, graphics, multimedia content, closed captioning content, Web content, and/or any other suitable content. As another example, media content may be provided as part of any suitable media product or service, such as programs broadcast over-the air, programs broadcast by a cable television provider, programs broadcast by a satellite television provider, on-demand programs, over-the-top programs, Internet content, streaming programs, recorded programs, and/or any other suitable programs. As yet another example, media content may have any suitable format, such as one or more of JPEG, H.264, MPEG-4AVC, MPEG-7, MP3, ASCII codes, WebP, WebM, and/or any other suitable format.

Figure 1:
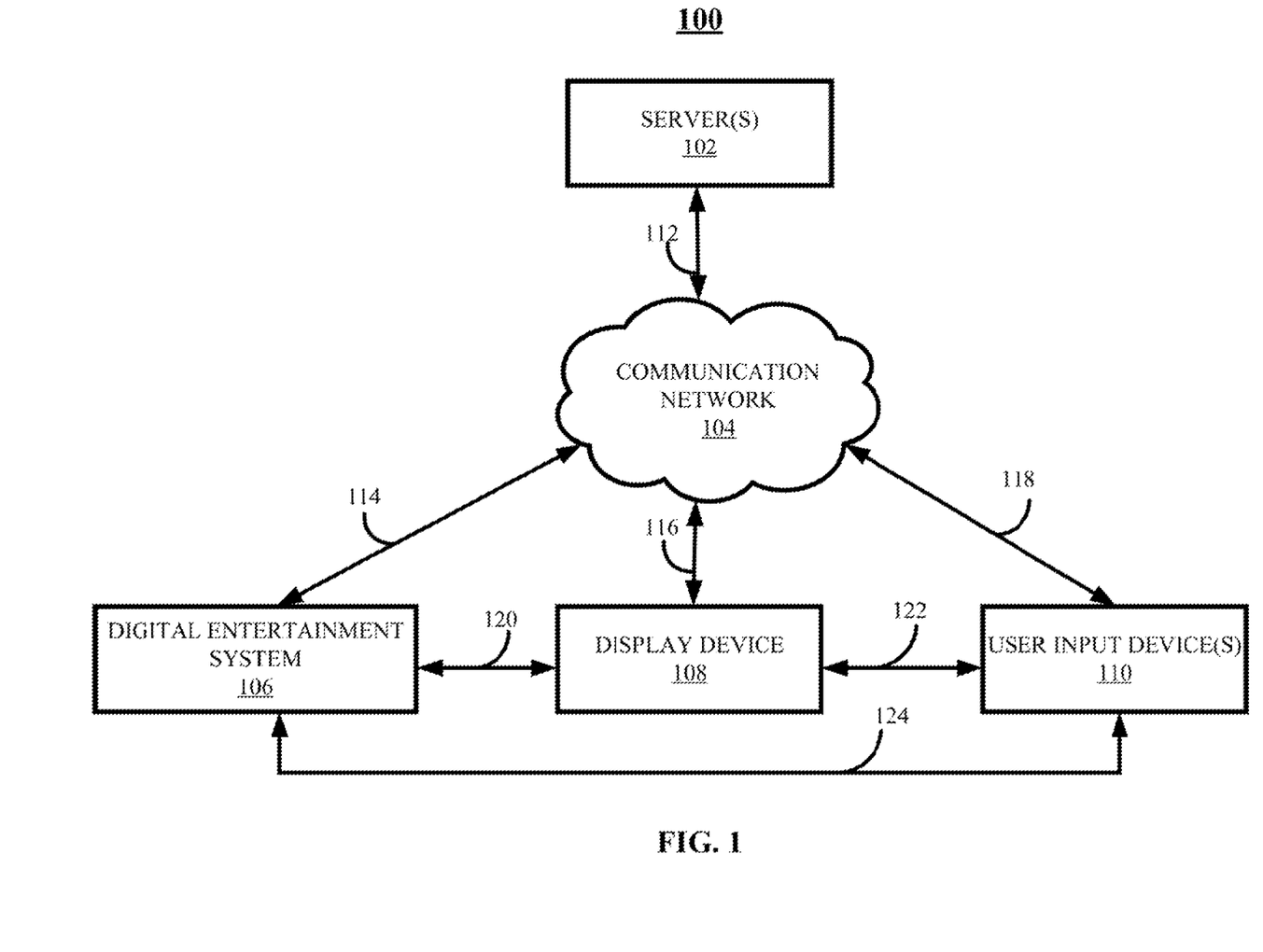
FIG. 1 shows a generalized block diagram of an example of a system for presenting media content in response to a channel change request in accordance with some implementations of the disclosed subject matter.
Figure 5:
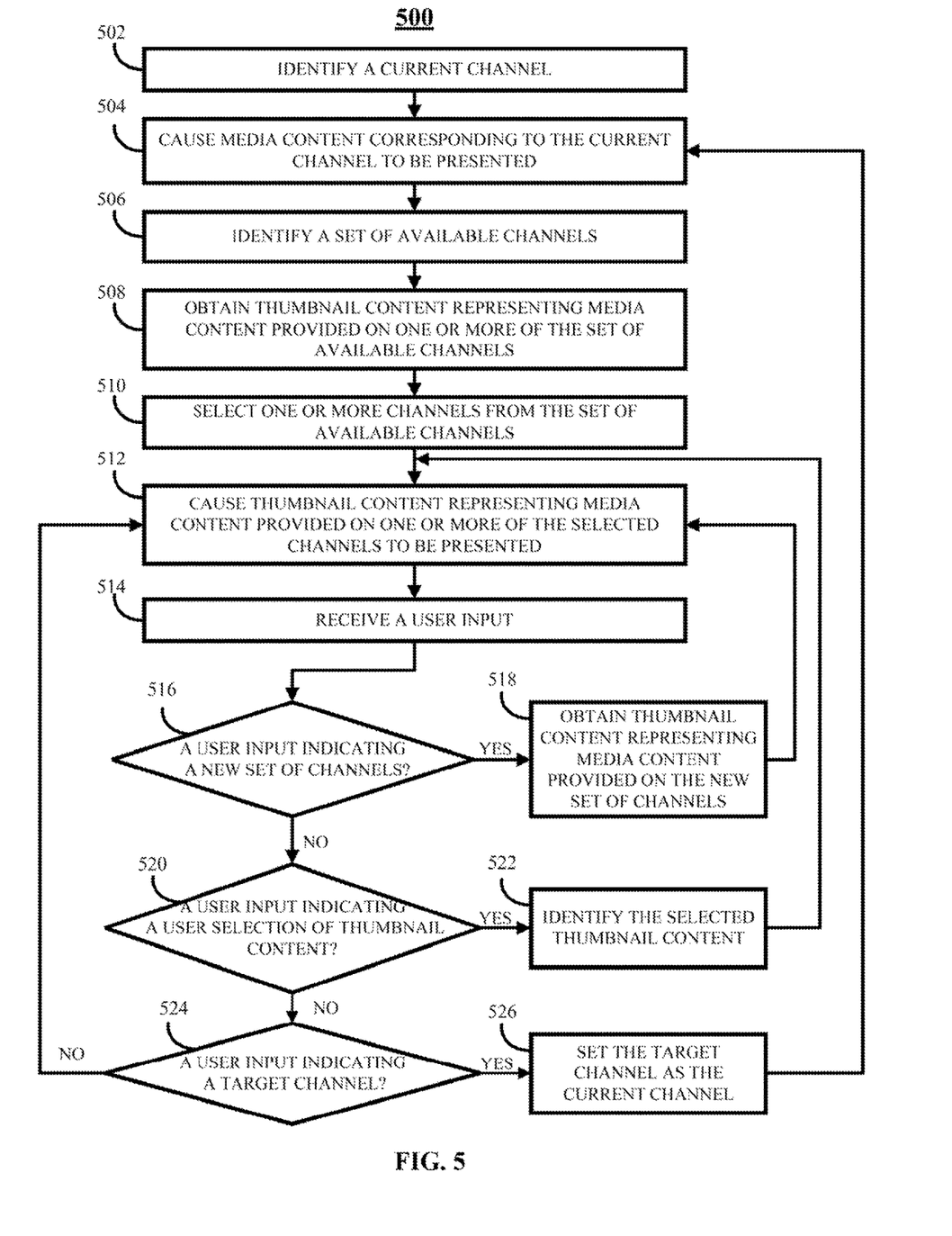
FIG. 5 shows a flow chart of an example of a process for presenting media content using one or more channel navigation interfaces in accordance with some implementations of the disclosed subject matter.
Figure 6:
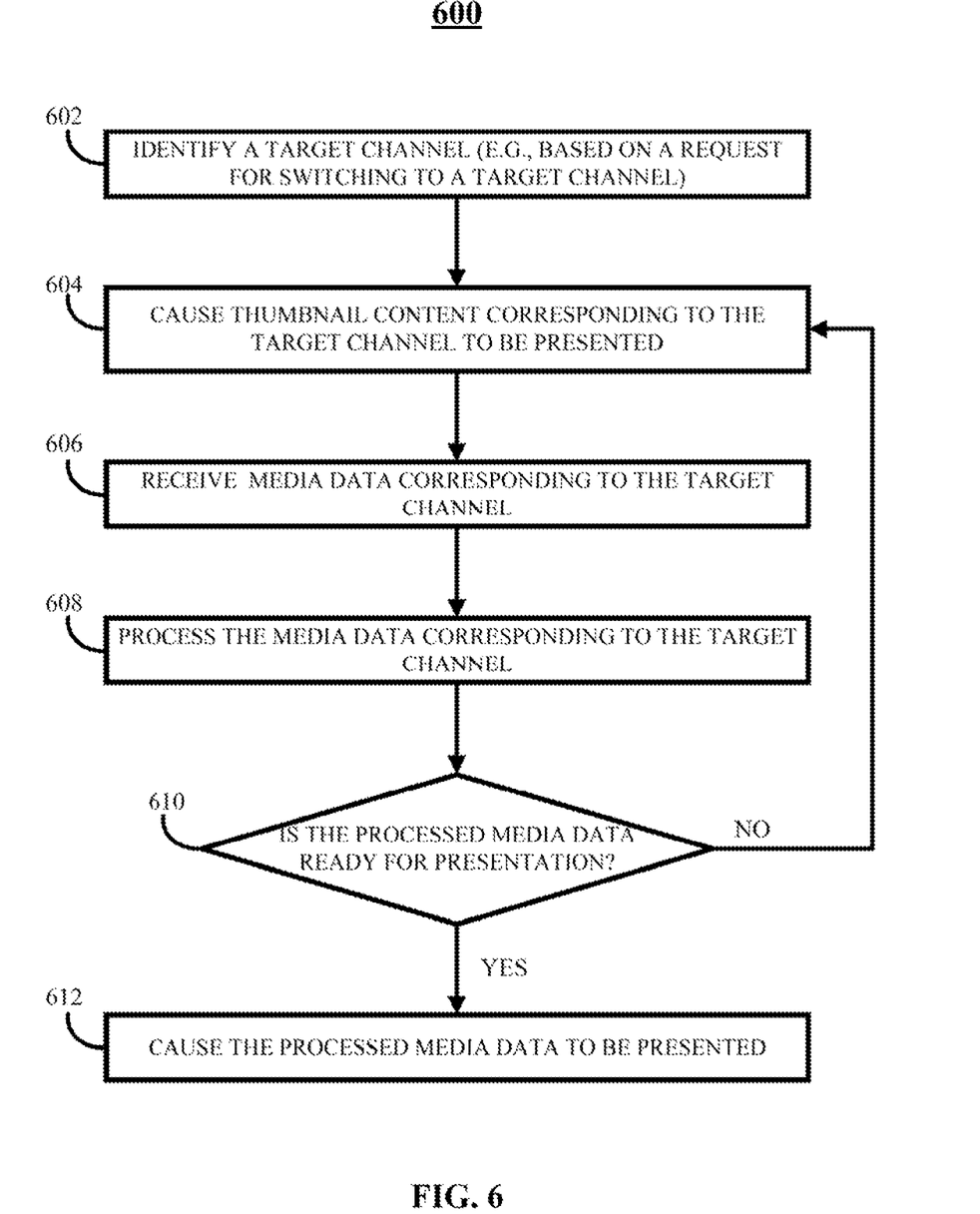
FIG. 6 shows a flow chart of an example of a process for presenting media content corresponding to a target channel in accordance with some implementations of the disclosed subject matter.
Figure 7:
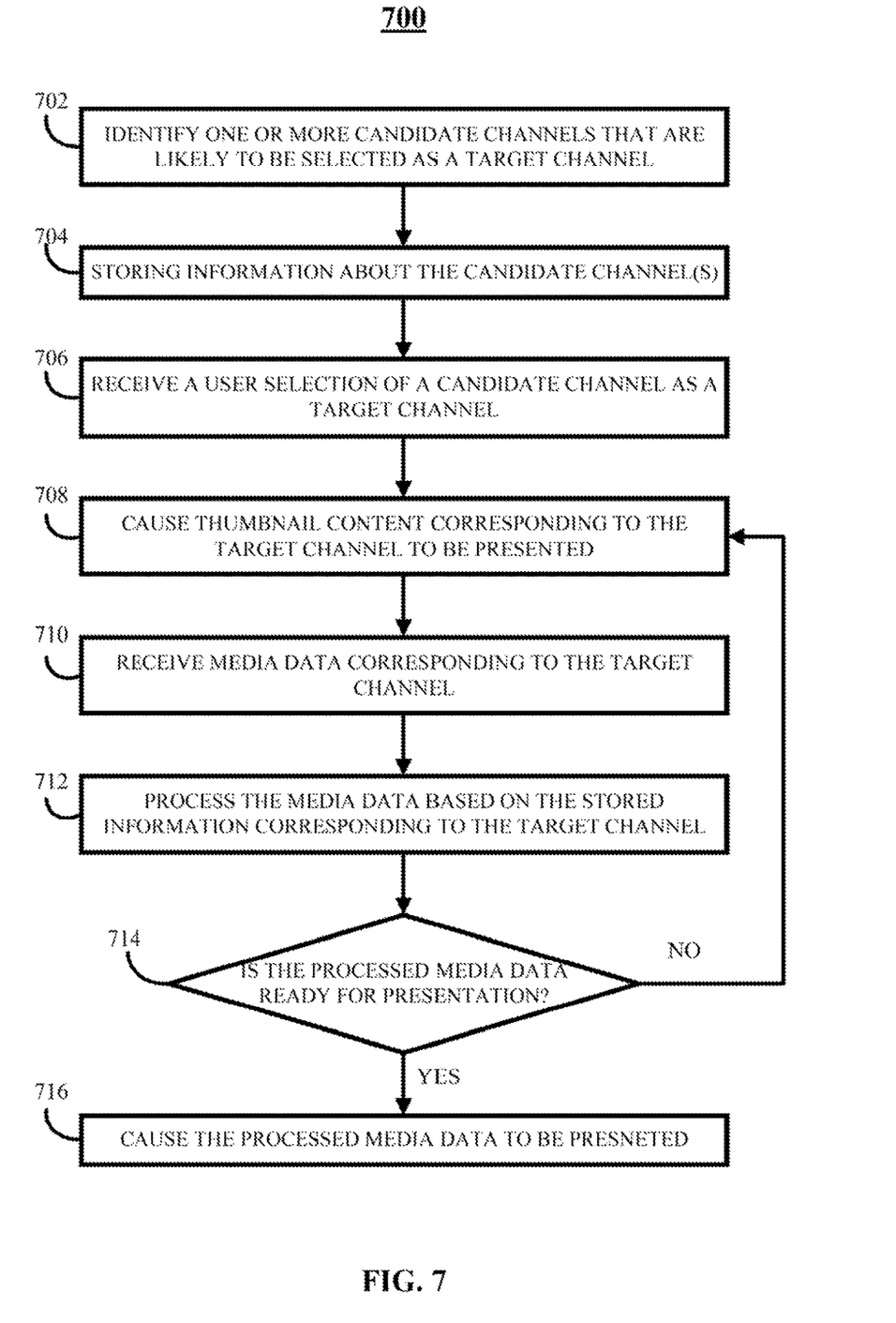
FIG. 7 shows a flow chart of an example of a process for presenting media content in response to a channel change request by predicting a target channel in accordance with some implementations of the disclosed subject matter.

Turning to FIG. 1, a generalized block diagram of an example 100 of a system for presenting media content in response to a channel change request in accordance with some implementations of the disclosed subject matter is shown. As illustrated, system 100 can include one or more servers 102, a communication network 104, a digital entertainment system 106, a display device 108, one or more user input devices 110, communication links 112, 114, 118, 120, 122, and 124, and/or any other suitable components. In some implementations, one or more suitable portions of processes 500, 600, and 700 as illustrated in FIGS. 5-7 can be implemented in one or more components of system 100. For example, one or more suitable portions of processes 500, 600, and 700 can run on one or more of server(s) 102, digital entertainment system 106, display device 108, and user input device(s) 110 of system 100.

Server(s) 102 can include any suitable device that is capable of receiving, converting, processing, rendering, and/or transmitting media content, generating or transmitting thumbnail content representing media content provided on one or more channels, and/or performing any other suitable functions, such as a hardware processor, a computer, a data processing device, or a combination of such devices.

Digital entertainment system 106 can include any suitable device that is capable of receiving, converting, processing, rendering, and/or transmitting media content, generating, receiving, processing, transmitting, and/or presenting thumbnail content representing media content provided on one or more channels, and/or performing any other suitable functions. For example, digital entertainment system 106 can include a set-top box, a digital media receiver, a DVD player, a BLU-RAY player, a game console, a desktop computer, a laptop computer, a tablet computer, a mobile phone, and/or any other suitable device, and/or any other suitable combination of the same.

Display device 108 can be any suitable device that is capable of receiving, converting, processing, and/or displaying media content, generating, receiving, processing, transmitting, and/or presenting thumbnail content, and/or performing any other suitable functions, such as a streaming media player, a media center computer, a CRT display, a LCD, a LED display, a plasma display, a touch-screen display, a simulated touch screen, a television device, a tablet user device, a mobile phone, a gaming console, and/or any other suitable device. In some implementations, media content presentation device 120 can be three-dimensional capable.

User input device(s) 110 can include any suitable device that is capable of receiving user inputs, such as a remote control, a directional pad, a mobile phone, a tablet computer, a laptop computer, a desktop computer, a personal data assistant (PDA), a portable email device, a game console, a voice recognition system, a gesture recognition system, a keyboard, a mouse, and/or any other suitable device.

In some implementations, a user input device(s) 110 can include a display that can present a channel navigation interface including thumbnail content representing media content provided on a set of channels (e.g., such as a channel navigation interface 310 as described hereinbelow in connection with FIG. 3). In response to receiving a user selection of a thumbnail presented on the display, the user input device(s) can identify a channel corresponding to the selected thumbnail and transmit information about the channel to display device 108 (e.g., a channel number associated with the channel, and/or any other suitable information that can be used to identify the channel). In some implementations, in response to receiving the information about the channel, display device 108 can switch to the channel and present media content provided on the channel.

In some implementations, each of server(s) 102, digital entertainment system 106, display device 108, and user input device(s) 110 can be implemented as a stand-alone device or integrated with other components of system 100.

Communication network 104 can be any suitable computer network such as the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), a satellite network, a mobile phone network, a mobile data network, a cable network, a telephone network, a fiber optic network, and/or any other suitable communication network, or any combination of any of such networks.

In some implementations, server(s) 102, digital entertainment system 106, display device 108, and user input device(s) 110 can be connected to communication network 104 through communication links 112, 114, 116, and 118, respectively. In some implementations, display device 108 can be connected to digital entertainment system 106 and user input device(s) 610 through communication links 120 and 122, respectively. In some implementations, digital entertainment system 106 can be connected to user input device(s) 110 through communication link 124. In some implementations, communication links 112, 114, 116, 118, 120, 122, and 124 can be any suitable communication links, such as network links, dial-up links, wireless links, hard-wired links, any other suitable communication links, or a combination of such links.

Each of server(s) 102, digital entertainment system 106, display device 108, and user input device(s) 110 can include and/or be any of a general purpose device such as a computer or a special purpose device such as a client, a server, and/or any other suitable device. Any such general purpose computer or special purpose computer can include any suitable hardware. For example, as illustrated in example hardware 200 of FIG. 2, such hardware can include a hardware processor 202, memory and/or storage 204, an input device controller 206, an input device 208, display/audio drivers 210, display and audio output circuitry 212, communication interface(s) 214, an antenna 216, and a bus 218.

Figure 2:
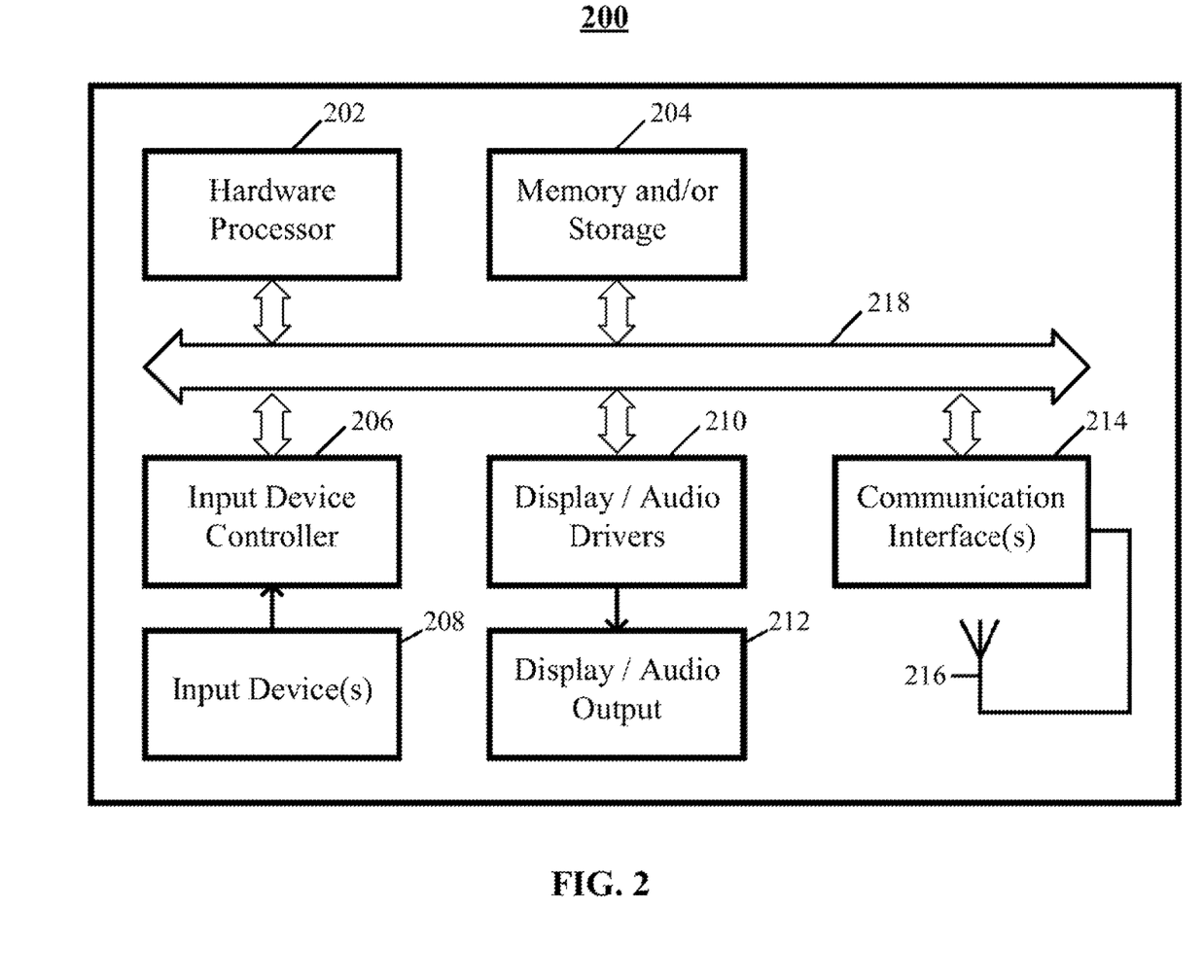
FIG. 2 shows an example of hardware that can be used in a server, a digital entertainment system, a display device, and/or a user input device in accordance with some implementations of the disclosed subject matter.

Hardware processor 202 can include any suitable hardware processor, such as a microprocessor, a micro-controller, digital signal processor, dedicated logic, and/or any other suitable circuitry for controlling the functioning of a general purpose computer or special purpose computer in some implementations.

Memory and/or storage 204 can be any suitable memory and/or storage for storing programs, data, media content, and/or any other suitable content in some implementations. For example, memory and/or storage 204 can include random access memory, read only memory, flash memory, hard disk storage, optical media, and/or any other suitable storage device.

Input device controller 206 can be any suitable circuitry for controlling and receiving input from one or more input devices 208 in some implementations. For example, input device controller 206 can be circuitry for receiving input from a touch screen, from one or more buttons, from a voice recognition circuit, from a microphone, from a camera, from an optical sensor, from an accelerometer, from a temperature sensor, from a near field sensor, and/or any other suitable circuitry for receiving user input.

Display/audio drivers 210 can be any suitable circuitry for controlling and driving output to one or more display and audio output circuitries 212 in some implementations. For example, display/audio drivers 210 can be circuitry for driving an LCD display, a speaker, an LED, and/or any other display/audio device.

Communication interface(s) 214 can be any suitable circuitry for interfacing with one or more communication networks, such as communication network 104 in some implementations. For example, interface(s) 214 can include network interface card circuitry, wireless communication circuitry, and/or any other suitable circuitry for interfacing with one or more communication networks.

Antenna 216 can be any suitable one or more antennas for wirelessly communicating with a communication network in some implementations. In some implementations, antenna 416 can be omitted when not needed.

Bus 218 can be any suitable mechanism for communicating between two or more of components 202, 204, 206, 210, and 214 in some implementations.

Any other suitable components can be included in hardware 200 in accordance with some implementations.

In some implementations, any suitable computer readable media can be used for storing instructions for performing the processes described herein. For example, in some implementations, computer readable media can be transitory or non-transitory. For example, non-transitory computer readable media can include media such as magnetic media (such as hard disks, floppy disks, and/or any other suitable media), optical media (such as compact discs, digital video discs, Blu-ray discs, and/or any other suitable optical media), semiconductor media (such as flash memory, electrically programmable read only memory (EPROM), electrically erasable programmable read only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Figure 3:
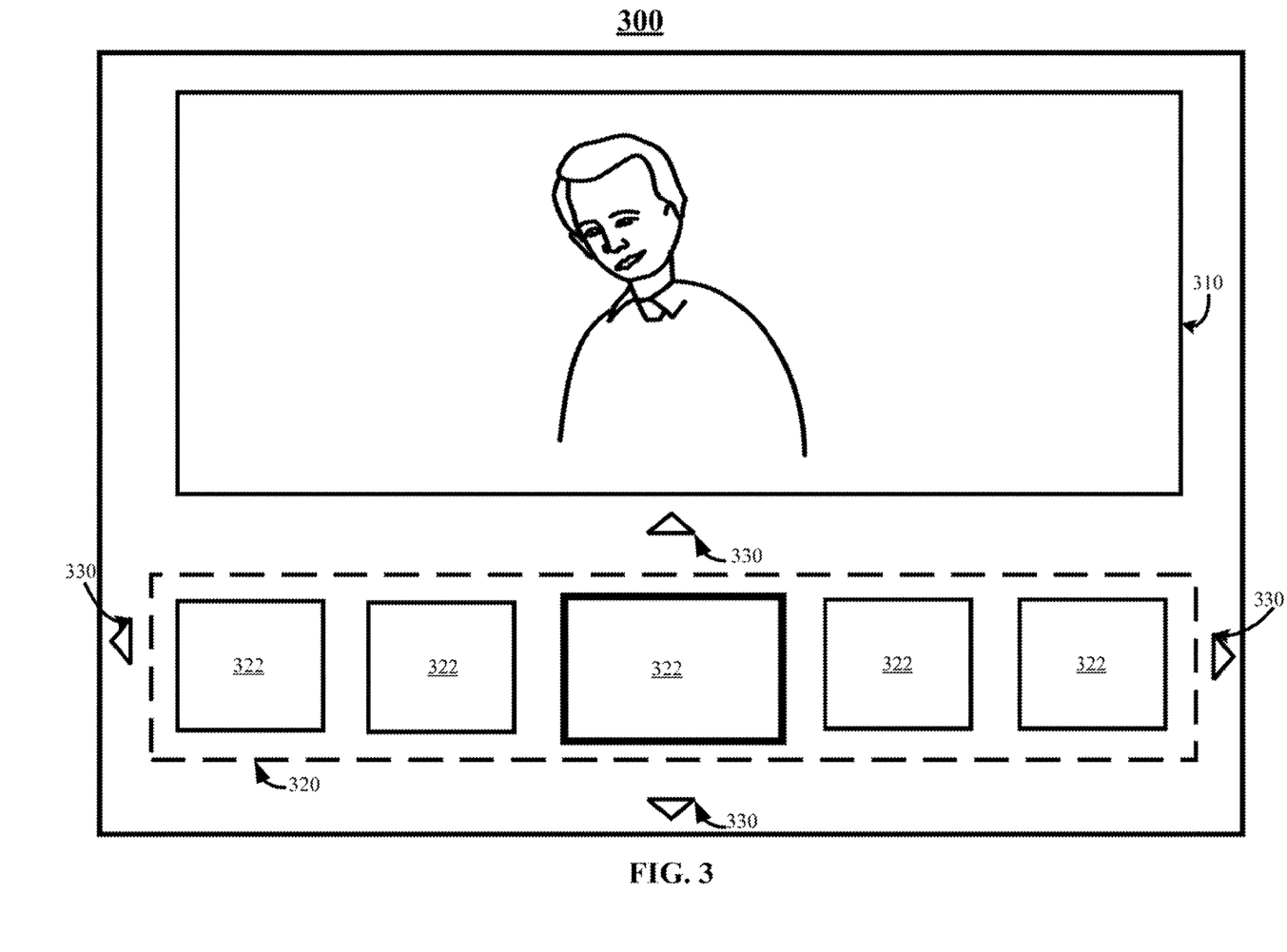
FIG. 3 shows an example of a channel navigation interface displayed with a playback area in accordance with some implementations of the disclosed subject matter.

Turning to FIG. 3, an example 300 of a user interface for presenting media content in response to a channel change request in accordance with some implementations of the disclosed subject matter is shown. In some implementations, interface 300 can be presented on a suitable display device, such as a display device 108 of FIG. 1 under the control of a hardware processor in display device 108 executing any suitable process, such as processes 500, 600, and/or 700 of FIGS. 5, 6, and 7.

As illustrated, user interface 300 can include a playback area 310, a channel navigation interface 320, one or more arrows 330, and/or any other suitable components. In some implementations, interface 300 can present media content provided on a particular channel in playback area 310. For example, the media content can include a television program being broadcast on a currently selected television channel.

Additionally, interface 300 can present media content provided on a set of channels in channel navigation interface 320. For example, interface 300 can present a set of thumbnail content items 322 representing media content provided on a set of channels. In some implementations, a thumbnail content item 322 can include thumbnail content (e.g., a thumbnail image, a video, an animation, and/or any other suitable content), captioning content, program information, and/or any other suitable representation of media content that is provided on a given channel. In some implementations, a thumbnail content item 322 can include a logo, an audio controlled waveform, an audio controlled animation, and/or or other suitable representation of audio content.

In some implementations, interface 300 can arrange and/or present available channels by category (e.g., movies, sports, high-definition content, media content related to media content being presented in playback area 310, and/or any other suitable category of channels). For example, a set of thumbnail content items 322 can represent media content provided on a set of channels associated with a particular category (e.g., a category that is selected by a user).

In some implementations, when presenting media content in playback area 310 and channel navigation interface 320, interface 300 can wait for and receive a user selection of a channel and/or a set of channels. In response to receiving a user selection of a channel by selecting one of the thumbnail content items, interface 300 can present resized thumbnail content corresponding to the selected channel in playback area 310 while preparing media content provided on the selected channel for presentation. In some implementations, interface 300 can present the media content provided on the selected channel in playback area 310 when the media content is ready for presentation.

In response to receiving a user selection of a new category (e.g., a previous category in a list of categories, a next category in a list of categories, or any other suitable category) via a selection of a direction corresponding to the new category (e.g., up, down, left, right, forward, backward, and/or any other suitable direction), the thumbnail content items being presented in channel navigation interface 320 can be replaced by one or more thumbnail content items representing media content provided on a set of channels associated with the new category.

In response to receiving a user selection of a thumbnail content item (e.g., a next thumbnail content item of a set of thumbnail content items, a previous thumbnail content item of a set of thumbnail content items, and/or any other suitable thumbnail content item) via a selection of a direction corresponding to the thumbnail content item (e.g., up, down, left, right, forward, backward, and/or any other suitable direction), interface 300 can identify the thumbnail content item by highlighting, enlarging, and/or in any other suitable manner.

It should be noted that playback area 310 and channel navigation interface 320 can be arranged in interface 300 in any suitable manner. For example, playback area 310 and channel navigation interface 320 can be placed in any suitable positions in the interface. In a more particular example, playback area 310 and channel navigation interface 320 may be overlapping, non-overlapping, or partially overlapping with each other. In another particular example, playback area 310 and channel navigation interface 220 can be arranged horizontally, vertically, and/or in any suitable manner. In yet another more particular example, playback area 310 and channel navigation interface 320 can be placed in a bottom portion, a top portion, a left portion, a right portion, and/or any other suitable portion of interface 300. In still another more particular example, each of playback area 310 and channel navigation interface 320 can be partially transparent or opaque.

It should be noted that although a set of thumbnail content items 322 are arranged horizontally as shown in FIG. 3, this is only illustrative. Any suitable number of thumbnail content items can be arranged in any suitable manner on a screen. For example, one or more of the thumbnail content items can be arranged vertically, diagonally, or in any other suitable manner.

As another example, each of playback area 310 and channel navigation interface 320 may have any suitable size. In a more particular example, the size of playback area 310 and/or channel navigation interface 320 may be adjusted in response to one or more user inputs (e.g., a user panning and/or zooming in a portion of playback area 310 and/or channel navigation interface 320 using a suitable user input device).

Figure 4:
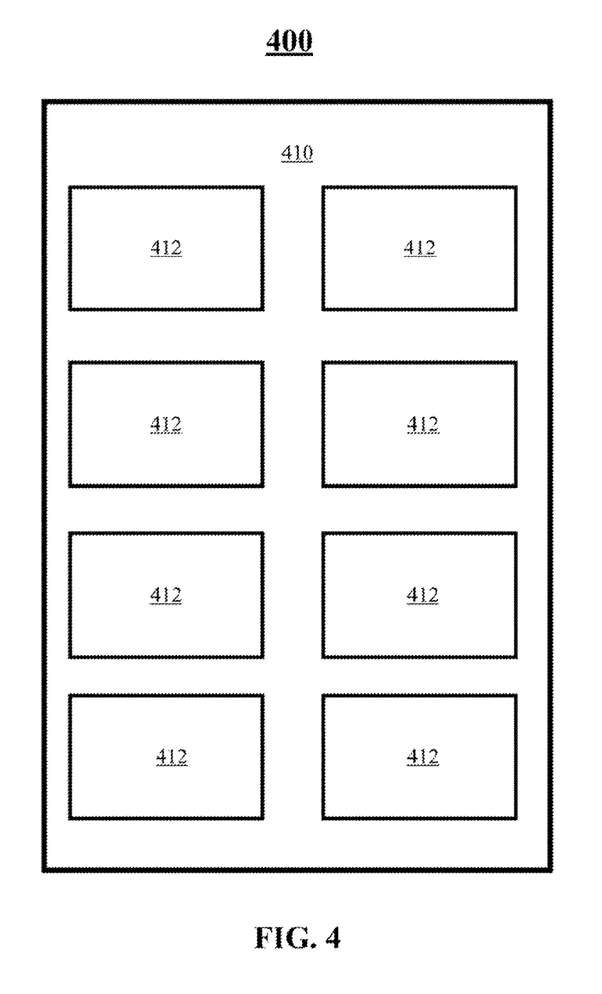
FIG. 4 shows an example of a channel navigation interface displayed without a playback area in accordance with some implementations of the disclosed subject matter.

Turning to FIG. 4, an example 400 of a user interface for presenting a channel navigation interface 410 without presenting a playback area to present media content in response to a channel change request in accordance with some implementations of the disclosed subject matter is shown. In some implementations, channel navigation interface 410 can be presented on a primary display device (e.g., a display device such as a display device 108 of FIG. 1) and/or a secondary display device (e.g., a display associated with a user input device, such as a user input device 110 of FIG. 1) under the control of a hardware processor executing any suitable process, such as processes 500, 600, and/or 700 of FIGS. 5, 6, and 7.

In some implementations, as illustrated, user interface 400 can present media content provided on a set of channels in a channel navigation interface 410. For example, a set of thumbnail content items 412 representing media content provided on a set of channels can be presented in channel navigation interface 410. In a more particular example, a thumbnail content item 412 can include thumbnail content and/or any other suitable representation of media content provided on a given channel. In some implementations, a thumbnail content item 412 can include a logo, an audio controlled waveform, an audio controlled animation, and/or or other suitable representation of audio content.

In some implementations, while presenting media content associated with a set of channels in channel navigation interface 410, interface 400 can wait for a user selection of a thumbnail content item and/or a channel. In some implementations, in response to a user selection of a given thumbnail content item 412 (e.g., using a suitable user input device, using suitable gestures, by touching the thumbnail content item, and/or in any other suitable manner), interface 400 can identify the channel corresponding to the selected thumbnail content item.

Additionally, interface 400 can generate information about the channel (e.g., a channel number associated with the channel, and/or any other suitable information that can be used to identify the channel) and transmit such information to a display device. In some implementations, in response to receiving the information about the channel, the display device can present resized thumbnail content corresponding to the selected channel in a suitable manner (e.g., in playback area 310 as shown in FIG. 3) while preparing media content provided on the selected channel for presentation. In some implementations, the display device can present the media content provided on the selected channel (e.g., in playback area 310 of FIG. 3) when the media content is ready for presentation.

Turning to FIG. 5, a flow chart of an example 500 of a process for presenting media content using one or more channel navigation interfaces in accordance with some implementations of the disclosed subject matter is shown.

As illustrated, process 500 can start by identifying a current channel at 502. The current channel can be identified in any suitable manner. For example, the current channel can be identified by detecting a channel that a digital entertainment system is currently tuned to. As another example, process 500 can communicate with a user input device (e.g., a remote control, a directional pad, a mobile phone, a tablet computer, a wearable computer, and/or any other suitable device that is capable of receiving user input) to determine the last channel that has been selected by a user. As yet another example, process 500 can capture an audio sample and/or a video sample of media content being presented on the current channel and identify the current channel based on the audio sample and/or the video sample. In a more particular example, the current channel can be identified by finding audio data and/or video data that matches the audio sample and/or the video sample in a database (e.g., based on one or more fingerprints associated with the audio sample and/or video sample).

Next, at 504, process 500 can cause media content provided on the current channel to be presented. Any suitable media content can be presented in a suitable manner. For example, process 500 can cause one or more of audio content, video content, text graphics, multimedia content, closed captioning content, and/or any other suitable media content corresponding to the current channel to be presented on one or multiple screens. In a more particular example, the media content corresponding to the current channel can be presented on multiple screens concurrently in some implementations.

As another example, the media content provided on the current channel can be displayed on a suitable display device. In a more particular example, as described in connection with FIG. 3 above, the media content corresponding to the current channel can be displayed in playback area 310 of interface 300 together with channel navigation interface 320.

At 506, process 500 can identify a set of available channels. Any suitable channel can be regarded as being an available channel. A set of available channels can include any suitable type(s) of channels. For example, an available channel can include an analog television channel, a digital television channel, a Web-based television channel, a video on demand channel, a Web content channel, a channel provided by a video hosting Web site, a radio channel, an audio channel, a program that can be used to present suitable media content (such as a Web browser, a media player, a streaming program, a gaming program, a book reader, a word processor, a presentation program, and/or any other suitable program), and/or any other suitable type of channel.

Any suitable media content can be provided on an available channel, such as one or more of audio content, video content, text, graphics, multimedia content, closed captioning content, Web content, and/or any other suitable content.

An available channel can be provided by any suitable source, such as a cable television provider, a satellite television provider, a Web site, an on-demand media content provider, a digital entertainment system (e.g., a DVD player, a BLU-RAY player, a game console, a set-top box, an electronic book reader, and/or any other suitable device that is capable of presenting media content), and/or any other suitable source of media content.

Next, at 508, process 500 can obtain thumbnail content representing media content provided on one or more of the set of available channels. Any suitable thumbnail content can be obtained, the thumbnail content can be obtained in any suitable manner, and the thumbnail content can have any suitable format. For example, for a particular channel, process 400 can obtain thumbnail content having a suitable resolution (e.g., a spatial resolution and/or a temporal resolution). As another example, process 400 can obtain multiple versions of the thumbnail content, such as thumbnail images, video clips, and/or any other suitable thumbnail content having multiple resolutions (e.g., spatial resolutions and/or temporal resolutions).

As yet another example, for a particular channel, thumbnail content can be obtained from a mechanism that generates images (e.g., such as one or more moving images, still images, and/or any other suitable images) and/or videos corresponding to media content provided on the particular channel. In a more particular example, the thumbnail image (s) can be obtained from a mechanism that generates thumbnail content by scaling one or more images provided on the particular channel by a suitable factor (e.g., 1, ½, ¾, and/or any other suitable scaling factor).

At 510, process 500 can select one or more channels from the set of available channels. The selection can be made in any suitable manner. For example, a set of channels can be selected based on historical information (e.g., search history information, browsing history information, at a particular time of day, on certain days of the week, and/or any other suitable criterion).

In a more particular example, process 500 can select one or more channels that are frequently consumed by a user for a particular time interval (e.g., within the last week, within the last month, and/or any other suitable time interval). In another more particular example, process 300 can select one or more channels from a list of favorite channels associated with a particular user (e.g., such as one or more favorite channels selected by the user, a set of channels that the user is subscribed to, and/or any other suitable channels associated with the user).

It should be noted that prior to receiving any historical information associated with a user, the mechanisms can provide the user with an opportunity to control whether any information about the user can be collected and/or how collected user information is used by the mechanisms. Additionally, certain information about the user can be stored locally (e.g., not shared), encrypted, and/or treated in one or more ways before it is stored to remove personally identifiable information. For example, a user's identity can be treated such that no personally identifiable information can be determined for the user. As another example, a user's geographic location can be generalized where location information is obtained (e.g., to a city level, a ZIP code level, a state level, etc.), so that a particular location of a user cannot be determined. Using these techniques and others described herein, the user can have control over what information is collected about the user and/or how that information is used by the mechanisms.

As another example, process 500 can select a set of channels by category. In a more particular example, a category of channels can correspond to one or more types of media content, such as movies, sports, comedy, shopping, education, and/or any other suitable type of media content. In another more particular example, a category of channels can correspond to media content having a given quality, such as a given display resolution, a given audio sampling rate, a given compression rate, and/or any other suitable quality.

At 512, process 500 can cause thumbnail content representing media content provided on one or more of the selected channels to be presented. The thumbnail content can be presented in any suitable manner. For example, for a given channel that is selected at 510, thumbnail content can be presented as one or more thumbnail images, a video (e.g., at a suitable frame rate), an animation (e.g., by generating interpolated images based on the thumbnail content), and/or in any other suitable form.

In another more particular example, thumbnail content corresponding to the given channel can be presented together with suitable information about the given channel, such as a channel number, a description of the given channel, information about the program being presented on the given channel, captioning content relating to the given channel, and/or any other suitable information about the given channel.

As another example, thumbnail content representing media content provided on a set of selected channels can be presented on one or more screens (e.g., of a display device 108 and a user input device 110 of FIG. 1) concurrently. In a more particular example, thumbnail content corresponding to a set of selected channels can be displayed on a primary screen (e.g., a screen of a display device 108 of FIG. 1) and/or a secondary screen (e.g., a screen of a user input device 110 of FIG. 1). In some implementations in which the screens have various sizes, process 500 can cause different versions of the thumbnail content to be presented on the screens (e.g., by transcoding the thumbnail content into one or more suitable formats, by receiving multiple versions of the thumbnail content from a suitable server, and/or any other suitable device).

In some implementations, process 500 can receive a user input at 514. The user input can be received in any suitable manner and can be received from any suitable source. For example, the user input can be received as being one or more radio signals, infrared signals, near-infrared signals, Wi-Fi signals, High-Definition Multimedia Interface (HDMI) signals (e.g., an HDMI Consumer Electronics Control (CEC) signal), and/or any other suitable signals, and the signal(s) can be transmitted from a suitable user input device, such as a remote control, a directional pad, a mobile phone, a tablet computer, and/or any other suitable device that is capable of receiving a user input.

In some implementations, the user input can correspond to a user selection of a direction, such as up, down, left, right, forward, backward, and/or any other suitable direction. A direction can be selected in any suitable manner. For example, a direction can be selected in response to receiving a user selection of one or more keys, buttons, and/or any suitable portion(s) of a user input device (e.g., a directional pad) corresponding to the direction. As another example, a direction can be selected in response to receiving one or more gestures indicating a user selection of the direction. As yet another example, a direction can be selected in response to a user selection of one or more arrows 330 of FIG. 3 corresponding to the particular direction (e.g., using a suitable user input device).

At 516, process 500 can determine whether the user input indicates that the user would like to be presented with a new set of channels. For example, the user input can be determined as indicating that the user would like to be presented with a new set of channels when the user input corresponds to a direction associated with a new category of channels (e.g., up, down, left, right, upward, backward, and/or any other suitable direction). In a more particular example, as described in connection with FIGS. 3 and 4 above, a set of thumbnail content items representing media content provided on a set of channels associated with a particular category (e.g., a current category) can be presented in a channel navigation interface (e.g., a channel navigation interface 320 of FIG. 3 and/or a channel navigation interface 410 of FIG. 4). In such an example, a user input can correspond to a direction associated with a new category, such as a previous category in a list of categories, a next category in a list of categories, or any other suitable category.

In some implementations, in response to determining that the user input indicates a user selection of a new set of channels, process 500 can obtain thumbnail content corresponding to the new set of channels at 518. Process 500 can then loop back to 512 and present thumbnail content corresponding to the new set of channels. More particularly, process 500 can replace a set of thumbnail content items being presented in a channel navigation interface (e.g., a channel navigation interface 320 of FIG. 3 and/or a channel navigation interface 410 of FIG. 4) with a set of thumbnail content items representing media content provided on a set of channels associated with the new category.

Alternatively, process 500 can determine whether the user input indicates a user selection of thumbnail content representing media content provided on a selected channel at 520. For example, process 500 can determine whether the user input indicates a user selection of a direction corresponding to a thumbnail content item in a channel navigation interface (e.g., a channel navigation interface 330 of FIG. 3 and/or a channel navigation interface 410 of FIG. 4), such as a next thumbnail content item of a set of thumbnail content items, a previous thumbnail content item of a set of thumbnail content items, and/or any other suitable thumbnail content item.

In some implementations, in response to determining that the user input indicates a user selection of thumbnail content corresponding to a channel, process 500 can identify the selected thumbnail image at 522 and loop back to 512. For example, process 500 can identify the selected thumbnail content by highlighting, enlarging, and/or in any other suitable manner. In a more particular example, as described in connection with FIG. 3, in response to receiving a user selection of a thumbnail content item (e.g., a next thumbnail content item of a set of thumbnail content items, a previous thumbnail content item of a set of thumbnail content items, and/or any other suitable thumbnail content item) in the form of one or more directional inputs, process 500 can cause the thumbnail content item to be highlighted, enlarged, and/or identified in any other suitable manner.

Alternatively, at 524, process 500 can determine whether the user input indicates a target channel. For example, a user input indicating a target channel can be received as being a confirmation of a user selection of thumbnail content corresponding to the target channel using a channel navigation interface. In a more particular example, as described above in connection with FIGS. 3 and 4, a target channel can be selected when a user confirms a selection of a thumbnail content item representing the target channel (e.g., by selecting a direction corresponding to the thumbnail content item and selecting an "OK" button using a user input device).

As another example, a user input indicating a target channel can be received as being a user selection of a channel number associated with the target channel (e.g., by a user entering the channel number, selecting a channel-up button and/or a channel-down button, and/or in any other suitable manner).

In some implementations, in response to determining that the user input does not indicate a target channel, process 500 can loop back to 512.

Alternatively, process 500 can set the target channel as the current channel and loop back to 504. For example, as described in connection with FIG. 3, the media content corresponding to the target channel can be displayed in playback area 310 to replace the media content corresponding to the current channel.

Any suitable media content corresponding to the target channel can be presented, such as thumbnail content, video data, audio data, closed captioning data, and/or any other suitable media content. In a more particular example, a process 600 of FIG. 6 and/or a process 700 of FIG. 7 can be performed to reduce the delay that a user normally experiences when switching channels.

Turning to FIG. 6, a flow chart of an example 600 of a process for presenting media content corresponding to a target channel in accordance with some implementations of the disclosed subject matter is shown.

As illustrated, process 600 can start by identifying a target channel at 602. The target channel can be identified in any suitable manner. For example, the target channel can be identified based on a request to switch to the target channel (e.g., such as a request to switch to a target channel as described in connection with FIG. 5).

Next, at 604, process 600 can cause thumbnail content and corresponding audio representing media content provided on the target channel to be presented. The thumbnail content can be presented in any suitable manner. For example, the thumbnail content can be presented on a screen based on the size of the screen and/or the size of a display area in which the thumbnail content can be presented. In a more particular example, process 600 can scale the thumbnail content to a suitable size and cause the scaled images to be presented in the display area.

At 606, process 600 can receive media data corresponding to the target channel. Any media data can be received in any suitable manner. For example, process 600 can cause a digital entertainment system to tune to the target channel and receive data about media content being presented on the target channel. As another example, the media data can include video data, audio data, closed captioning data, metadata, and/or any suitable data about media content being presented on the target channel. In a more particular example, the media data can include one or more encoded images, one or more parameters that can be used to decode and/or display the encoded images, and/or any other suitable video data.

At 608, process 600 can process the media data corresponding to the target channel. The media data can be processed in any suitable manner. For example, the media data can be demodulated, demultiplexed, decrypted, decoded, transcoded, and/or processed in any other suitable manner. In a more particular example, process 600 can extract encoded video data (e.g., a set of encoded images) from the media data and decode the encoded video data (e.g., by generating one or more decoded images). In another more particular example, process 600 can extract encoded audio data from the media data corresponding to the target channel and decode the encoded audio data in a suitable manner. In another more particular example, process 600 can synchronize the decoded video data and the decoded audio data for presentation.

At 610, process 600 can determine whether the processed media data is ready for presentation. This determination can be made in any suitable manner. For example, the processed media data can be regarded as being ready for presentation when a threshold number of decoded images have been generated. As another example, the processed media data can be regarded as being ready for presentation when one or more portions of the audio data and the video data corresponding to the target channel have been decoded and synchronized in a suitable manner. As yet another example, the processed media data corresponding to the target channel can be regarded as being ready for presentation when the fullness of a video buffer reaches a threshold level.

In some implementations, in response to determining that the processed media data is not ready for presentation, process 600 can loop back to 604.

Alternatively, process 600 can proceed to 612 and cause the processed media data to be presented in any suitable manner. The processed media data can be presented in any suitable manner. For example, one or more images (e.g., still images, moving images, and/or any other suitable images) generated based on the media data can be presented on one or more screens. As another example, the thumbnail content being presented for the target channel can be replaced with the processed media data.

Turning to FIG. 7, a flow chart of an example 700 of a process for presenting media content in response to a channel change request by predicting a target channel in accordance with some implementations of the disclosed subject matter is shown.

As illustrated, process 700 can start by identifying one or more candidate channels that are likely to be selected as a target channel at 702. The identification can be performed in any suitable manner. For example, the candidate channel(s) can include one or more channels relating to a current channel that is being presented. In a more particular example, the candidate channel(s) can include one or more neighboring channels to the current channel, such as a channel that can be selected using one or more channel-up instructions, channel-down instructions, directional inputs, and/or any other suitable user input. In some implementations, after identifying a given channel as being a candidate channel, process 600 can identify one or more channels relating to the given channel (e.g., one or more neighboring channels) as being candidate channel(s) as well.

As another example, the candidate channel(s) may include one or more channels associated with a user. In a more particular example, the candidate channel(s) may include one or more channels that are frequently consumed by the user for a particular time interval (e.g., within the last week, within the last month, and/or any other suitable time interval). In another more particular example, process 700 can determine the time of day and select as one or more candidate channels one or more channels that are regularly presented to the user at the time of day. In yet another more particular example, process 700 can identify a set of favorite channels selected by a user as one or more candidate channels.

It should be noted that in implementations described herein in which the mechanisms described herein collect information about a particular user, the user can be provided with an opportunity to control whether the mechanisms collect information about the user and/or how collected user information is used by the mechanisms. Additionally, certain information about the user can be stored locally (e.g., not shared), encrypted, and/or treated in one or more ways before it is stored to remove personally identifiable information. For example, a user's identity can be treated such that no personally identifiable information can be determined for the user. As another example, a user's geographic location can be generalized where location information is obtained (e.g., to a city level, a ZIP code level, a state level, etc.), so that a particular location of a user cannot be determined. Using these techniques and others described herein, the user can have control over what information is collected about the user and/or how that information is used by the mechanisms.

As yet another example, in response to one or more user inputs corresponding to information about a channel, process 700 can identify one or more channels relating to the information as being candidate channels. In a more particular example, in response to a user entering a number (e.g., "5"), process 700 can identify one or more channels associated with the number (e.g., channels 5, 50, 51, and/or any other suitable channel associated with the number) as being candidate channel(s). Alternatively or additionally, process 700 can identify one or more channels that are associated with the number and that are frequently consumed by a user as being candidate channels. More particularly, for example, in response to a user entering a number "5," process 700 can select one or more channels associated with the number (e.g., 5 and 50) from a set of favorite channels associated with the user (e.g., 5, 7, 11, 43, and 50) as being candidate channels.

As still another example, after information about a given channel has been presented for a threshold time interval, the channel can be regarded as being a candidate channel. In a more particular example, in response to a user selection of information about a particular channel (e.g., using an electronic program guide, a channel navigation interface (e.g., channel navigation interface 320 of FIG. 3 or channel navigation interface 410 of FIG. 4), a search mechanism, and/or any other suitable mechanism), the channel can be regarded as being a candidate channel when a selection of a new channel has not been received for a threshold time interval.

Next, at 704, process 700 can store information about the candidate channel(s). Any suitable information about the candidate channel(s) can be stored to facilitate presentation of media content corresponding to the candidate channel(s). For example, one or more images corresponding to a given candidate channel can be information that is stored. In a more particular example, process 700 can store one or more video frames corresponding to the candidate channel, such as one or more reference frames (e.g., an I-frame, a P-frame, and/or any other suitable frame) that can be used to decode other frames, one or more decoded frames, and/or any other suitable frames, as information about the candidate channel(s).

As another example, the information about the candidate channel(s) may include one or more parameters that can be used to demodulate, decode, present, and/or process media content corresponding to the candidate channel(s), such as one or more access control codes, decryption keys, motion vectors, coding modes, timestamps (e.g., presentation timestamps, decode timestamps, and/or any other suitable timestamps), and/or any other suitable parameters.

As yet another example, one or more suitable portions of media content corresponding to the candidate channel(s) can be stored as information about the candidate channel(s) in some implementations. In a more particular example, process 700 can record and store media content being presented on a given candidate channel for a suitable time interval as information about the candidate channel(s).

In some implementations, information about one or more candidate channels can be stored in any suitable storage device. For example, one or more suitable buffers can be used to store such information. In a more particular example, the buffer(s) can include a circular buffer that can be implemented in volatile memory that can be overwritten when new data is received.

At 706, process 700 can receive a user selection of a candidate channel as a target channel. This user selection can be received in any suitable manner. For example, the target channel can be identified based on a request to switch to the target channel (e.g., such as a request to switch to a target channel as described in connection with FIG. 5).

In some implementations, at 708, process 700 can cause thumbnail content corresponding to the target channel to be presented. At 710, process 700 can receive media data corresponding to the target channel. In some implementations, steps 708 and 710 can be performed in substantially the same manner as 604 and 606 of FIG. 6, respectively.

At 712, process 700 can process the media data based on stored information corresponding to the target channel. For example, process 700 can decrypt one or more suitable portions of the media data based on one or more stored decryption keys, an access control word, and/or any other suitable stored information corresponding to the target channel. As another example, process 700 can generate one or more decoded images based on one or more stored images (e.g., an I-frame, a reference frame, and/or any other suitable frame), coding parameters, and/or any other suitable stored information corresponding to the target channel. As yet another example, process 700 can synchronize video data and audio data corresponding to the target channel based on one or more stored timestamps (e.g., presentation timestamps).

In some implementations, at 714, process 700 can determine whether the processed media data is ready for presentation. The determination can be made in any suitable manner. For example, the processed media data can be regarded as being ready for presentation when a threshold number of stored images corresponding to the target channel have been retrieved. As another example, the processed media data can be regarded as being ready for presentation when a threshold number of decoded images have been generated based on the stored information corresponding to the target channel. As yet another example, the processed media data can be regarded as being ready for presentation when audio data and video data corresponding to the target channel have been synchronized based on the stored information.

In some implementations, in response to determining that the processed media data is not ready for presentation, process 700 can loop back to 708.

Alternatively, process 700 can proceed to 716 and cause the processed media data to be presented. The processed media data can be presented in any suitable manner. For example, thumbnail content being presented for the target channel can be replaced with the processed media data in some implementations. As another example, process 700 can retrieve one or more stored images corresponding to the target channel and cause the retrieved images to be presented on one or more suitable screens. As yet another example, process 700 can cause one or more decoded images corresponding to the target channel to be presented on one or more suitable screens.

It should be noted that the above steps of the flow diagrams of FIGS. 5-7 can be executed or performed in any order or sequence not limited to the order and sequence shown and described in the figure. Also, some of the above steps of the flow diagrams of FIGS. 5-7 can be executed or performed substantially concurrently where appropriate or in parallel to reduce latency and processing times. Furthermore, it should be noted that FIGS. 5-7 are provided as examples only. At least some of the steps shown in these figures may be performed in a different order than represented, performed concurrently, or altogether omitted.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), and/or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The provision of the examples described herein (as well as clauses phrased as "such as," "e.g.," "including," and the like) should not be interpreted as limiting the claimed subject matter to the specific examples; rather, the examples are intended to illustrate only some of many possible aspects.

Accordingly, methods, systems, and media for presenting media content in response to a channel change request are provided.

Although the disclosed subject matter has been described and illustrated in the foregoing illustrative implementations, it is understood that the present disclosure has been made only by way of example, and that numerous changes in the details of implementation of the disclosed subject matter can be made without departing from the spirit and scope of the disclosed subject matter, which is limited only by the claims that follow. Features of the disclosed implementations can be combined and rearranged in various ways.

What is claimed is:

1. A method for presenting media content corresponding to a channel change request, the method comprising:
   retrieving thumbnail content items, wherein the thumbnail content items include an animated representation of undecoded media content from a corresponding content source;
   in response to interacting with a thumbnail content item, as a referenced thumbnail, from the retrieved thumbnail content items, causing the animated representation of the media content of the referenced thumbnail to replace displayed media content being presented in a display area by resizing the animated representation from a first size to a second size corresponding to a size of media content being presented in the display area while concurrently processing media content associated with the referenced thumbnail from the corresponding content source that includes decoding media data corresponding to the media content; and
   replacing the animated representation of the media content being presented in the display area with the processed media content.

2. The method of claim 1, wherein the thumbnail content items correspond to content sources that have been identified as likely to be interacted with by a viewer.

3. The method of claim 1, wherein the interaction with the referenced thumbnail is a request to switch from a first content source to a second content source in which a selection of the thumbnail content item that corresponds with a media content item from the second content source has been received.

4. The method of claim 1, wherein the animated representation of the media content being presented in the display area is replaced with the processed media content in response to determining that the decoded media data corresponding to the media content provided from the corresponding content source is ready for presentation.

5. The method of claim 1, further comprising concurrently presenting the media content of the referenced thumbnail in the display area and a first subset of the thumbnail content items from the thumbnail content items that correspond to a first subset of the content source to be presented in a navigation area.

6. The method of claim 5, wherein the first subset of the thumbnail content items are presented in the first size and wherein the media content is presented in the second size.

7. The method of claim 5, further comprising:
receiving an indication to present additional thumbnail content items; and
in response to receiving the indication to present the additional thumbnail content items, causing a second subset of the thumbnail content items from the thumbnail content items that correspond to a second subset of the content source to replace the first subset of the thumbnail content items, wherein the second subset of the thumbnail content items are presented in the first size and within the navigation area.

8. The method of claim 1, further comprising determining whether the media content provided on the corresponding content source is ready for presentation by determining whether decoded audio data corresponding to the media content provided on the corresponding content source and decoded video data corresponding to the media content provided on the corresponding content source have been synchronized based on stored information corresponding to the corresponding content source.

9. The method of claim 1, further comprising, in response to determining that decoded audio data corresponding to the media content provided on the corresponding content source and decoded video data corresponding to the media content provided on the corresponding content source have not been synchronized at a first time, continuing to present the animated representation corresponding to the thumbnail content item in the display area and continuing to process the media content corresponding to the corresponding content source.

10. The method of claim 1, further comprising causing audio content corresponding to the corresponding content source to be presented in response to interacting with the thumbnail content item from the retrieved thumbnail content items.

11. A system for presenting media content corresponding to a channel change request, the system comprising:
a hardware processor that:
retrieves thumbnail content items, wherein the thumbnail content items include an animated representation of undecoded media content from a corresponding content source;
in response to interacting with a thumbnail content item, as a referenced thumbnail, from the retrieved thumbnail content items, causes the animated representation of the media content of the referenced thumbnail to replace displayed media content being presented in a display area by resizing the animated representation from a first size to a second size corresponding to a size of media content being presented in the display area while concurrently processing media content associated with the referenced thumbnail from the corresponding content source that includes decoding media data corresponding to the media content; and
replaces the animated representation of the media content being presented in the display area with the processed media content.

12. The system of claim 11, wherein the thumbnail content items correspond to content sources that have been identified as likely to be interacted with by a viewer.

13. The system of claim 11, wherein the interaction with the referenced thumbnail is a request to switch from a first content source to a second content source in which a selection of the thumbnail content item that corresponds with a media content item from the second content source has been received.

14. The system of claim 11, wherein the animated representation of the media content being presented in the display area is replaced with the processed media content in response to determining that the decoded media data corresponding to the media content provided from the corresponding content source is ready for presentation.

15. The system of claim 11, wherein the hardware processor further concurrently presents the media content of the referenced thumbnail in the display area and a first subset of the thumbnail content items from the thumbnail content items that correspond to a first subset of the content source to be presented in a navigation area.

16. The system of claim 15, wherein the first subset of the thumbnail content items are presented in the first size and wherein the media content is presented in the second size.

17. The system of claim 15, wherein the hardware processor further:
receives an indication to present additional thumbnail content items; and
in response to receiving the indication to present the additional thumbnail content items, causes a second subset of the thumbnail content items from the thumbnail content items that correspond to a second subset of the content source to replace the first subset of the thumbnail content items, wherein the second subset of the thumbnail content items are presented in the first size and within the navigation area.

18. The system of claim 11, wherein the hardware processor further determines whether the media content provided on the corresponding content source is ready for presentation by determining whether decoded audio data corresponding to the media content provided on the corresponding content source and decoded video data corresponding to the media content provided on the corresponding content source have been synchronized based on stored information corresponding to the corresponding content source.

19. The system of claim 11, wherein the hardware processor further, in response to determining that decoded audio data corresponding to the media content provided on the corresponding content source and decoded video data corresponding to the media content provided on the corresponding content source have not been synchronized at a first time, continues to present the animated representation corresponding to the thumbnail content item in the display area and continues to process the media content corresponding to the corresponding content source.

20. The system of claim 11, wherein the hardware processor further causes audio content corresponding to the corresponding content source to be presented in response to interacting with the thumbnail content item from the retrieved thumbnail content items.

21. A non-transitory computer-readable medium containing computer-executable instructions that, when executed by a processor, cause the processor to perform a method for presenting media content corresponding to a channel change request, the method comprising:
retrieving thumbnail content items, wherein the thumbnail content items include an animated representation of undecoded media content from a corresponding content source;
in response to interacting with a thumbnail content item, as a referenced thumbnail, from the retrieved thumbnail content items, causing the animated representation of the media content associated with the referenced thumbnail to replace displayed media content being presented in a display area by resizing the animated representation from a first size to a second size corresponding to a size of media content being presented in the display area while concurrently processing media content associated with the referenced thumbnail from the corresponding content source that includes decoding media data corresponding to the media content; and
replacing the animated representation of the media content being presented in the display area with the processed media content.

* * * * *